(12) United States Patent
Lasater

(10) Patent No.: US 6,232,004 B1
(45) Date of Patent: *May 15, 2001

(54) METHODS FOR TREATING CERAMIC MATERIALS AND IMPROVED TREATED CERAMIC MATERIALS PRODUCED THEREBY

(75) Inventor: Brian J. Lasater, East Wenatchee, WA (US)

(73) Assignee: Pacific Coast Technologies, Inc., Wenatchee, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/235,223

(22) Filed: Jan. 22, 1999

Related U.S. Application Data

(63) Continuation-in-part of application No. 09/074,029, filed on May 6, 1998, now abandoned.

(51) Int. Cl.$^7$ ............................. C04B 35/48; B05D 3/02; B05D 5/06
(52) U.S. Cl. ......................... 428/702; 428/688; 428/699; 427/190; 427/191; 427/192; 427/229; 427/376.6; 427/383.5; 501/103
(58) Field of Search .................................... 427/190, 229, 427/350, 376.1, 376.2, 376.3, 383.5, 374.1, 191, 192, 376.6; 428/688, 699, 702; 501/103

(56) References Cited

U.S. PATENT DOCUMENTS

| | | | |
|---|---|---|---|
| 4,656,145 | 4/1987 | Soroi | 501/86 |
| 4,678,683 | * 7/1987 | Pasco et al. | 427/123 |
| 4,749,594 | * 6/1988 | Malikowski et al. | 427/190 |
| 4,820,562 | * 4/1989 | Tanaka et al. | 428/34.6 |
| 5,032,304 | * 7/1991 | Toyota | 252/62.9 |
| 5,223,195 | * 6/1993 | Kuwabara | 264/60 |
| 5,519,278 | * 5/1996 | Kahn et al. | 310/326 |
| 5,525,560 | 6/1996 | Yamazaki et al. | 501/103 |
| 5,616,223 | 4/1997 | Shen et al. | 204/295 |
| 5,624,542 | 4/1997 | Shen et al. | 204/283 |
| 5,711,906 | 1/1998 | Briod | 264/63 |

OTHER PUBLICATIONS

Correia, R.N., et al., "Microstructure of diffusional zirconia–titanium and zirconia—(Ti–6 wt% Al–4 wt% V) alloy joints," *Journal of Materials Science*, vol. 33, pp. 215–221 (1998).

* cited by examiner

Primary Examiner—Timothy Meeks
Assistant Examiner—Michael Barr
(74) Attorney, Agent, or Firm—Ann W. Speckman

(57) ABSTRACT

The present invention provides methods for treating ceramic materials, including oxide ceramic materials such as zirconia, with a treatment agent comprising a metallic material, such as titanium, by contacting a surface of the ceramic material with the treatment agent and heating the assembly to a temperature at which the ceramic material incorporates a portion of the metallic material by diffusion. The treated ceramic material is uniformly darkened and exhibits improved structural and physical properties.

15 Claims, 2 Drawing Sheets

METHODS FOR TREATING CERAMIC MATERIALS AND IMPROVED TREATED CERAMIC MATERIALS PRODUCED THEREBY

REFERENCE TO RELATED APPLICATION

This application is a continuation-in-part of U.S. patent application Ser. No. 09/074,029, filed May 6, 1998 now abandoned.

FIELD OF THE INVENTION

The present invention relates to methods for treating ceramic materials, especially oxide ceramic materials such as zirconia, to stain or darken the material and to impart improved structural and physical properties. The present invention also comprehends ceramic materials treated according to the treatment methods to provide a class of materials having metallic species dispersed in the ceramic structure. Ceramic materials having metallic species dispersed therein exhibit superior structural and physical properties.

BACKGROUND OF THE INVENTION

Ceramic materials have desirable properties for many applications. Zirconia ceramics are especially desirable, because they are generally harder, stronger, more impact resistant, and less reactive with materials in the environment, such as body fluids, than many other ceramics, making them suitable materials for applications where the ceramic components are subjected to harsh environments.

Most untreated oxide ceramic materials, such as zirconia, are light in color. Processing of such ceramic materials, including assembly of oxide ceramic components into assemblies including different materials, may produce discoloration of the ceramic material. Sealing of ceramic components to metallic components, for example, often produces discoloration of the ceramic material. Discolored ceramic materials may exhibit the same desirable properties as ceramic materials having a uniform coloration, but they are far less desirable from a commercial standpoint. It is therefore desirable to darken ceramic materials so that discoloration is not apparent. Darkened ceramic materials may also be preferred for certain applications.

U.S. Pat. No. 5,711,906 discloses a method of manufacturing a black zirconia-based article that incorporates a stabilizer and a pigment. Zirconia powder is mixed with a stabilizer, a pigment formed by a cobalt and iron oxide powder or by a spinel $CoFe_2O_4$ powder, and a binder, the mixture is granulated, and the desired article is molded, sintered and polished. The '906 patent also discloses that molded, stabilized zirconia elements will become black if sintered at a temperature of 1,400° to 1,600° C. in a non-oxidizing atmosphere.

U.S. Pat. No. 4,656,145 discloses a black zirconia decorative article produced by sintering an unsintered molded body comprising a zirconia matrix and a stabilizer in a non-oxidizing atmosphere, such as a carbon-containing atmosphere to produce a blackened, sintered article. Blackening agents include zirconium carbide, carbon or a reduction product of zirconia in an amount of 0.001 to 1% by weight. Sintering promoters such as silica, alumina or titania may be incorporated in the unsintered molded body.

SUMMARY OF THE INVENTION

The present invention provides methods for treating ceramic materials, including oxide ceramic materials such as zirconia, with a treatment agent comprising a metallic material, such as titanium. The treatment darkens the ceramic material and, additionally, imparts improved structural and physical properties. According to one aspect, methods of the present invention involve treating a sintered ceramic material by contacting at least one of the ceramic surfaces with a treatment agent comprising a metallic component, and heating the ceramic material, while in contact with the treatment agent, to a temperature at which the ceramic material incorporates metallic species of the metallic component by diffusion to produce a ceramic material having metallic species dispersed in the ceramic structure.

According to another aspect, a green compact of a ceramic material, such as a zirconia material, is treated with a debinding agent, such as a thermal or chemical debinding agent, and the green compact is then sintered in the presence of a treatment agent comprising a metallic component. The metallic component may be introduced using various techniques that are described in greater detail below.

Treatment methods of the present invention may be adapted to treat a variety of oxide ceramic materials, including zirconia ceramics and stabilized zirconia ceramics, alumina, yttria, beryllia, and other oxide ceramics. Zirconia ceramic materials stabilized with yttria, magnesia, ceria or calcia are preferred ceramic materials, and yttria-stabilized zirconia is an especially preferred ceramic material.

Treatment techniques of the present invention involve treating the ceramic material with a treatment agent comprising a metallic species such as titanium, zirconium, nickel, cobalt, manganese, vanadium, chromium, copper, hafnium, silver, aluminum, tantalum, niobium, molybdenum, or a mixture of any of the above metallic species. The treatment agent may be in any form in which one or more metallic components is available for diffusion or dispersion into the ceramic structure under treatment conditions. The metallic component of the treatment agent may take various forms. Metallic, metallic sponge, metallic hydride, and organo-metallic forms of appropriate metallic species are suitable for use as treatment agents. Such treatment agents may be directly contacted to a ceramic material and heated under the appropriate conditions, as described below, to induce diffusion or dispersion of the metallic component into the ceramic structure.

Alternatively, a treatment agent comprising a metallic component may be contacted to or deposited on a ceramic surface, for example, by physical or chemical vapor deposition. Sublimation pumps, including both sputtering and evaporable sublimation pumps, may be used to deposit a treatment layer comprising a suitable metallic component on one or more exposed surfaces of a ceramic material. An evaporable getter or getter device comprising a suitable metallic component may also be used to deposit a treatment layer comprising the metallic component on one or more exposed surfaces of a ceramic material. Suitable getters and gettering devices preferably comprise: zirconium; titanium; barium; hafnium, zirconium-vanadium-iron; zirconium-aluminum; zirconium-iron; zirconium-vanadium-titanium-iron; zirconium-graphite; or any combination of these metallic species.

Ceramic components and surfaces having various conformations and configurations may be treated using the methods of the present invention. Surfaces to be treated are preferably cleaned to remove any foreign or oxidized materials. The ceramic treatment surface(s) to be treated are contacted with a treatment agent comprising a metallic component, such that a metallic species is available for diffusion or dispersion into the ceramic structure under treatment conditions. According to an embodiment wherein the treatment agent comprises metallic particles or metallic sponge or metallic hydride material, or an organometallic material, the metallic material is distributed uniformly on the ceramic surface(s) being treated. Similarly, if a treatment layer comprising a metallic component is deposited on surface(s) of a ceramic material prior to or during treatment using chemical or physical vapor deposition by means of a sublimation pump or a getter or getter device, a layer of uniform thickness is preferred for many applications. For specialized applications where non-uniform diffusion or dispersion of a metallic species into a ceramic material is desired, the treatment layer may be applied in a non-uniform manner, as desired.

An assembly comprising the ceramic material in contact with the treatment agent is heated under vacuum conditions to the desired treatment temperature and held at the treatment temperature for the desired treatment time to induce diffusion of a metallic species into the ceramic structure. Alternatively, methods whereby a metallic species is deposited on the surface of the ceramic material and made available for diffusion or dispersion into the ceramic structure, and then diffused or dispersed into the ceramic structure in an integrated process, may be implemented. In addition to the diffusion or dispersion of metallic species into the ceramic structure, preferred treatment techniques induce oxygen depletion in the ceramic material and migration of oxygen species toward the surface of the ceramic material in proximity to the metallic component of the treatment agent. Following treatment at the desired treatment temperature for the desired treatment time, the assembly is cooled and any residual treatment agent material or derivative may be removed.

According to preferred embodiments, oxide ceramic materials such as zirconia ceramic materials, especially stabilized zirconia ceramic materials, are contacted with a treatment agent comprising a metallic species such as titanium by means of one of the techniques described herein and heated, under vacuum conditions, to a treatment temperature of about 1100 to 1400° C. for about one minute to several hours. The ceramic material is cooled and any residual titanium particles or titanium-containing film may be removed from the surface of the treated ceramic. The treated ceramic material is darkened uniformly and may be polished, if desired, to produce a shiny surface having uniform coloration. Various levels of coloration, including dark grey and black ceramic materials, may be produced using the techniques disclosed herein.

Oxide ceramic materials treated according to the methods of the present invention have a metallic species, such as titanium, dispersed throughout the structure of the treated ceramic material. Additionally, such treated ceramic materials are generally depleted of oxygen species and exhibit a distribution of oxygen species within the ceramic structure that is different from the distribution of oxygen species in the untreated oxide ceramic material.

Treated ceramic materials of the present invention are suitable for use in various and diverse applications. The treated ceramic materials may be employed, for example, in applications such as implantable medical devices, gas separation membranes, oxygen sensors, fuel cells, electrical connectors and electronics packages, structural components, components for various types of tools and equipment, including, for example, water jet apertures, sand blasting nozzles, internal pump components, static dissipative components, guide bearings, bushings, spindles for textile manufacturing, mirrors for use in connection with lasers; sporting goods, jewelry, including watch faces and watch components, blades, knives, scissors, and the like.

Treated zirconia materials having a metallic species dispersed in the ceramic structure having an electrical resistance in the range of about $10^9$ ohm/cm$^2$ may be produced using methods of the present invention. Such materials are suitable for use in electrostatic discharge applications such as semiconductor manufacturing applications.

BRIEF DESCRIPTION OF THE DRAWINGS

Preferred embodiments of the present invention will be described with reference to the figures, in which.

DESCRIPTION OF PREFERRED EMBODIMENTS

Figure 1:
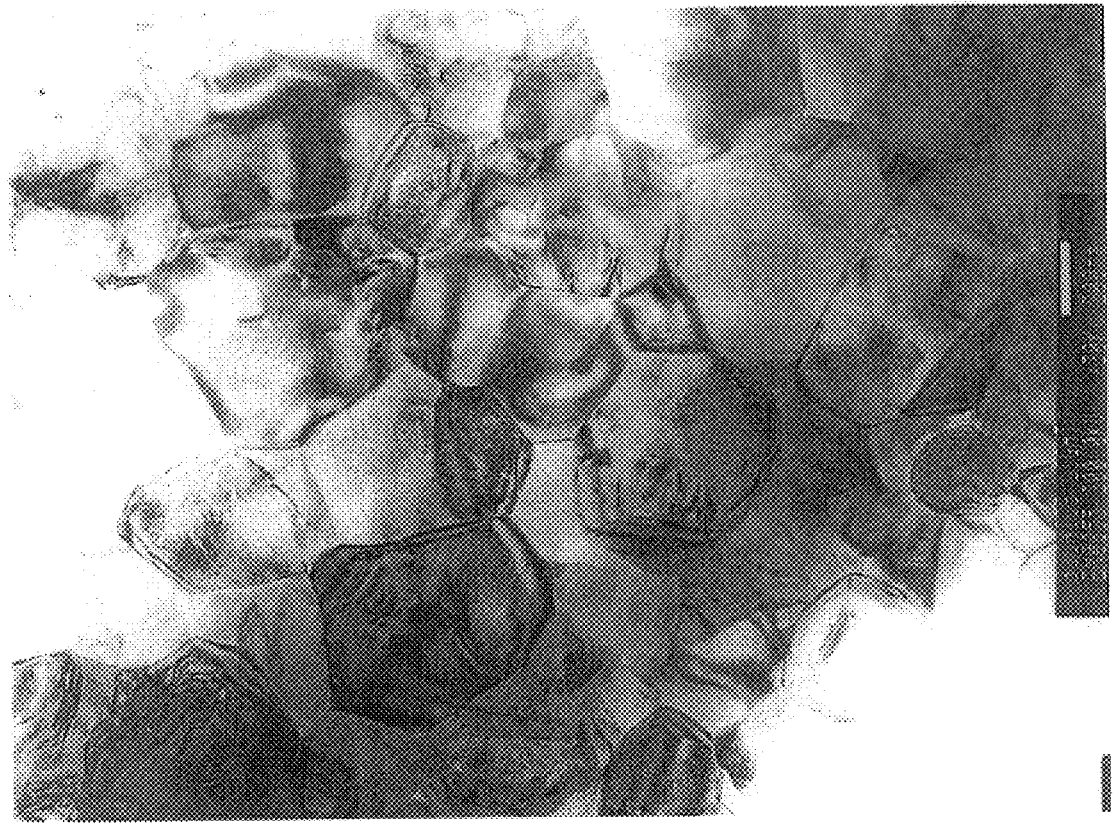
FIG. 1 illustrates a transmission electron micrograph of a cross-section of an untreated zirconia ceramic material.

Treatment methods of the present invention involve treatment of an oxide ceramic material, such as zirconia, with a treatment agent comprising a metallic species under conditions that promote diffusion of the metallic species into the ceramic material and distribution of the metallic species in the ceramic structure. In addition to promoting diffusion of a metallic species into the ceramic material, treatment methods of the present invention preferably promote migration of oxygen species dispersed throughout the ceramic material toward the surface(s) of the ceramic material in proximity to the treatment agent.

Oxide ceramic materials treated according to the methods of the present invention result in a new class of ceramic materials that are characterized by the presence of a metallic species in the ceramic structure and a distribution of oxygen species throughout the treated ceramic material that is different from the distribution of oxygen species in untreated materials. More specifically, preferred ceramic materials produced according to treatment methods of the present invention comprise zirconia ceramic materials having titanium metallic species distributed in the zirconia ceramic structure, and having an oxygen distribution different from the oxygen distribution exhibited by untreated zirconia materials. The concentration of oxygen species in the treated oxide ceramic material is preferably lower than the concentration of oxygen species in untreated oxide ceramic materials. For some applications, methods of the present invention may be implemented to provide a treated oxide ceramic material in which the distribution of oxygen species forms a gradient, with the lowest distribution of oxygen species in proximity to the surface(s) of the ceramic material treated with the treatment agent, and a higher concentration of oxygen species in areas of the ceramic material that are distant from exposed surface(s).

Ceramic and ceramic-like materials, including oxide ceramics such as zirconia, are suitable for use with the treatment methods of the present invention. Ceramic materials comprising zirconia are suitable, and stabilized zirconia materials are preferred. Partially stabilized zirconia (PSZ), tetragonal zirconia (TTZ), and zirconia ceramics stabilized with yttria, magnesia, ceria or calcia, or a combination of stabilizing materials, are preferred, and yttria-stabilized zirconia materials are especially preferred. Suitable materials are available commercially and may be provided in a variety of configurations using, for example, injection molding techniques. Ceramic materials may be in a sintered or green form and may also be polished prior to treatment according to the methods of the present invention.

At least one surface of a ceramic material to be treated, such as a stabilized zirconia ceramic material, is preferably cleaned to remove any foreign or oxidized materials prior to treatment. Selected ceramic surfaces are contacted with treatment agents of the present invention comprising one or more metallic species. Suitable metallic species of the present invention may comprise titanium, zirconium, nickel, cobalt, manganese, vanadium, chromium, copper, hafnium, silver, aluminum, tantalum, niobium, molybdenum, or any combination of any of the above metals. Titanium and zirconium are preferred metallic species.

According to one embodiment, the treatment agent is provided in the form of metallic particles, metallic sponge, metallic hydride, or organo-metallic materials, or in any other form in which the metallic species is available for diffusion into the ceramic material under treatment conditions. Treatment agents of the present invention in the form of metallic particles, metallic sponge material, metallic hydrides or organo-metallic materials comprising titanium, zirconium, nickel, cobalt, manganese, vanadium, chromium, silver, aluminum or copper, or any combination thereof, are preferred. Especially preferred treatment agents of the present invention comprise titanium or zirconium particles, sponge, hydride or organo-metallic materials in a paste form.

An especially preferred treatment agent of the present invention comprises metallic titanium or zirconium particles in a purified particulate form known as "sponge" material. Titanium sponge material in a granular form having a purity of at least 99% is available commercially from Alpha, a Johnson-Mathey Company located in Ward Hill, Mass. Zirconium sponge material is also available and is suitable for use in treatment methods of the present invention.

When the treatment agent is provided in a particle, powder or paste form, at least one ceramic surface is preferably contacted with a uniform distribution of the treatment agent. If the treatment agent is in a particle or powder form, one or more ceramic components may be placed in a receptacle containing the treatment agent, for example, so that the treatment agent contacts the exposed surfaces of the ceramic component.

Multiple components may be treated simultaneously using this technique, as the receptacle and its contents are subjected to the treatment conditions. Under some circumstances, it is only necessary to contact selected surfaces of the ceramic component with the treatment agent. For example, the interior surfaces of the cavity of a ceramic component, such as an annular, flattened ceramic sleeve, may be contacted with titanium particles by filling the cavity with titanium particles. This assembly, comprising the ceramic sleeve filled with titanium particles, may be treated according to methods of the present invention to provide a ceramic sleeve that is uniformly darkened at both interior and exterior surfaces, and throughout the thickness of the component.

Alternatively, ceramic materials may be contacted by a treatment agent comprising a metallic species by depositing a thin layer or film of a treatment agent directly on one or more surface(s) of the ceramic material prior to or during the treatment process. Suitable methods for depositing a treatment agent comprising a metallic species on the surface of a ceramic component include physical and chemical vapor deposition. Sublimation pumps, including both sputtering and evaporable sublimation pumps, may be used to deposit a treatment layer comprising a suitable metallic species on one or more exposed surfaces of a ceramic material. Titanium is an especially preferred metallic species for deposition on ceramic surfaces using physical and chemical vapor deposition techniques. Deposition of the metallic species may occur prior to treatment, with the ceramic material having a metal species deposited thereon subjected to treatment according to the present invention, or deposition of the metallic species may be achieved as part of the treatment methodology. Thin layers or films of the treatment agent on the order of from 1,000 to 100,000 Angstroms may be deposited using these techniques. The desired thickness of the deposited treatment agent layer varies, depending on the size and geometry of the ceramic material being treated, and on the desired properties and coloration of the treated ceramic material.

Metallic species may also be deposited on exposed ceramic surfaces using metallic getters or gettering devices. Preferred evaporable getters and gettering devices preferably comprise: zirconium; titanium; barium; hafnium; zirconium-vanadium-iron; zirconium- aluminum; zirconium-iron; zirconium-vanadium-titanium-iron; or zirconium-graphite. Suitable getters and gettering devices are commercially available, for example, from SAES Getters, a Worldwide Group. Information concerning such products is available in the Internet at www.saesgetters.com. Many getters and gettering devices have an activation temperature of from about 400° C. to about 9000 C, at which temperature the metallic species is deposited on the surface of a substrate material, such as a ceramic material. The ceramic substrate having a metallic species deposited thereon may then be treated according to methods of the present invention. Alternatively, processing using the getter or gettering device may be integrated with the treatment methods to provide deposition of the metallic species on the ceramic substrate prior to diffusion of the metallic species into the ceramic structure.

According to embodiments wherein the metallic species is contacted to the surface of a ceramic material, an assembly composed of the ceramic material having the metallic species deposited thereon is treated according to methods of the present invention. The ceramic/metallic assembly and any receptacle retaining ceramic component and treatment agent, is heated under vacuum conditions to a treatment temperature and retained at the treatment temperature for a treatment time. Treatment temperatures in excess of 1100° C., and generally between about 1100° C. and 1400° C. are preferred, with treatment temperatures in excess of 1200° C., and between about 1200° C. and 1300° C., being especially preferred for treating sintered oxide ceramic materials, such as yttria stabilized ceramic materials, with treatment agents comprising a titanium metallic species. Treatment temperatures in excess of 1300° C., and generally between about 1400° C. and about 1600° C., and preferably between about 1450° C. and about 1500° C. are especially preferred for treating unsintered oxide ceramic materials, combining the sintering and treatment of such materials to produce a sintered oxide ceramic material having a metallic species, such as titanium, dispersed throughout the ceramic structure.

Treatment times of at least about one minute, generally from about one minute to about three hours, preferably from about five minutes to about two hours, and most preferably from about 10 minutes to about 90 minutes are preferred. Rapid cooling of the treated ceramic material from the treatment temperature is preferred. Cooling of the treated ceramic material from treatment to ambient temperatures in a time period of less than one hour is desired, and cooling from treatment to ambient temperatures in a time period of less than 30 minutes, preferably about 20 minutes, is preferred. Vacuum levels of about $10^{-3}$ torr or lower are preferred during treatment, and vacuum levels of about $10^{-5}$ torr or lower are especially preferred.

Treatment times and temperatures may vary, depending on the degree of darkening desired, the structural and/or physical properties desired, and the composition and configuration of the ceramic component being treated. Ceramic components such as cylinders, plates or other ceramic structures having thin walls may be treated at generally lower temperatures and for shorter treatment times than ceramic components having thicker walls or greater structural complexity. Similarly, optimal treatment temperatures and times may vary for treatment of different oxide ceramic materials with the various treatment agents disclosed herein. The identification of optimal treatment conditions may easily be achieved by one with ordinary skill in the art without undue experimentation.

During the thermal treatment, oxide ceramic substrates experience diffusion of one or more metallic species into the ceramic structure. Additionally, treatment of an oxide ceramic substrate according to the present invention generally involves a change in the concentration and distribution of oxygen species in the ceramic material. In general, the treated oxide ceramic material, in addition to having metallic species dispersed throughout its structure, also has a reduced concentration of oxygen species compared to the concentration of oxygen species in the untreated oxide ceramic material. In some cases, depending on the treatment protocol implemented, the treated oxide material may additionally have a distribution of oxygen species in the ceramic structure that is different from the distribution of oxygen species in the untreated ceramic structure. During treatment, oxygen species tend to migrate toward the surface of the ceramic substrate subjected to the treatment agent, and areas in proximity to ceramic surface(s) contacting the treatment agent frequently exhibit a lower concentration of oxygen species than areas that are distant from the ceramic surface(s) contacting the treatment agent.

Migration and depletion of oxygen species during treatment according to the present invention is desirable for many applications. Migration and depletion of oxygen species may be promoted by heating the ceramic/metallic assembly in the presence of a material or a device that sorbs gases such as oxygen species. Getter or gettering devices that sorb gases from oxide ceramic substrates at the treatment temperatures may be used for this purpose. Such gas sorption materials and devices are well known.

Following treatment at an elevated temperature for a treatment time under specified vacuum conditions, the assembly is cooled and, if appropriate, residual metallic materials such as particles or films comprising metallic species are removed from the ceramic surface(s). Residual metallic materials may be removed by abrasion, tumbling, or other techniques that are well known in the art. The treated ceramic surface generally has a dull finish and may be polished using conventional ceramic polishing techniques to provide a shiny, reflective surface.

Ceramic materials treated according to the methods of the present invention may be darkened to a uniform color on the surface and throughout the thickness of the ceramic material. The treatment methods may also be modified to darken just the surface of a ceramic component, or to provide various degrees of darkness.

Treated ceramic materials of the present invention, in addition to exhibiting a different coloration from the starting ceramic material, exhibit dramatically different crystalline structures, and improved structural and physical properties. Specifically, zirconia ceramic materials having titanium metallic species dispersed therein that were treated according to the methods of the present invention have a highly modified crystalline structure exhibiting a high defect density, including both stacking and twinning faults. Untreated oxide ceramic materials, in contrast, exhibit a very low defect density.

Treated ceramic materials of the present invention have metallic species dispersed in the ceramic structure. Treatment methods may be adapted to provide treated ceramic materials having metallic species dispersed substantially uniformly throughout the ceramic structure, or to provide treated ceramic materials having a higher concentration of metallic species dispersed in proximity to the surface(s) of the ceramic material exposed to the treatment agent. Treated ceramic materials having metallic species dispersed in the ceramic structure exhibit improved flexural strength, improved wear resistance, reduced microporosity and reduced electrical resistance compared to untreated ceramic materials. Additionally, zirconia ceramic materials may be treated according to methods of the present invention to produce treated zirconia materials having an electrical resistance in the range of about $10^9$ ohm/cm$^2$.

The treatment methods and the treated ceramic materials produced thereby have been described, above, with respect to certain preferred embodiments. It will be recognized that additional configurations, process parameters, arrangements and embodiments may be developed without departing from the methods and materials of the present invention. The Examples set forth below describe the results of representative experiments and are not intended to limit the invention in any fashion.

EXAMPLE 1

FIG. 1 illustrates a transmission electron micrograph of a cross-section of a yttria stabilized zirconia ceramic material. The untreated, stabilized zirconia material exhibits a crystalline structure having a very low rate of defects.

An equivalent stabilized zirconia material was treated according to methods of the present invention by contacting it with titanium sponge material, and heating the ceramic sample in contact on its exposed surfaces to the titanium sponge material to a treatment temperature of 1250° C. for a treatment time of 30 minutes under vacuum conditions of approximately $10^{-5}$ Torr. The assembly was cooled and extraneous titanium material was removed from the surface of the ceramic substrate by polishing to produce the "treated zirconia material."

Figure 2:
FIG. 2 illustrates a transmission electron micrograph of a cross-section of a zirconia ceramic material of the type illustrated in FIG. 1 treated with a treatment agent comprising titanium particles according to the methods of the present invention.

FIG. 2 illustrates a transmission electron micrograph of the treated zirconia material taken at the same magnification as the image of FIG. 1. The appearance of the treated material is very different from the appearance of the untreated material. The treated zirconia material exhibits a high defect density, particularly compared to the low defect density of the untreated material. The defects include both stacking and twinning faults. Treatment of the stabilized zirconia with the metallic titanium according to the method of the present invention induced substantial strain in the ceramic material, as evidenced by the altered crystalline structure. The defects and strain induced in the treated ceramic crystalline structure produces a material having greater flexural strength than the untreated material.

EXAMPLE 2

An oxide ceramic material, namely yttria-stabilized zirconia, was treated using several metallic species. In each circumstance, a yttria-stabilized zirconia substrate was contacted with the metallic species in a particle or hydride form and the assembly was heated to a temperature of 1250° C. for a treatment time of 30 minutes at a vacuum level of $10^{-5}$ Torr. The oxide ceramic substrates were treated with the following metallic species; titanium; zirconium; nickel; silver; chromium; copper; and aluminum. Titanium and zirconium metallic species produced uniformly darkened treated ceramic material, while the other metallic species produced various colorations of the treated ceramic materials.

EXAMPLE 3

The physical and structural properties of yttria stabilized ceramic materials treated to produce dispersal of metallic titanium species in the ceramic structure were ascertained. The treatment methods described in Examples 2 and 3 were used.

The flexural strength of eight samples of the treated zirconia material was measured using Mil Std 1942A (Configuration B). The fracture toughness of eight samples of the treated zirconia material described above was measured using a single edge notch beam on a 1 inch span. The flexural strength and Weibull Modulus of thirty-three (33) samples of the treated zirconia material described above was measured using a four point bending technique. The Vickers Hardness of fifteen (15) samples of zirconia ceramic treated according to methods of the present invention was tested using the ASTM C1 327 protocol. The density, elastic modulus and Poissons ratio of five (5) samples of zirconia ceramic treated according to methods of the present invention was tested using the ASTM C1198 protocol.

The test results are shown below in Table 1. The properties of the Treated Material are compared with the properties of several commercially available, untreated stabilized zirconia materials identified as Zirconia Types A–G. The color of the Treated Material is black, while the other stabilized zirconia materials have a white or ivory color. The flexural strength of the Treated Material is 1254 Mpa, which is from about 200 to about 450 Mpa greater than the flexural strength of the commercially available comparison materials. This represents a significant increase in flexural strength. The Treated Material, produced according to methods of the present invention, has metallic species dispersed in the ceramic structure and has a flexural strength of at least 1050 Mpa. With respect to the remaining properties tested, the Treated Material is equivalent or superior to the commercially available comparison materials.

TABLE 1

Zirconia Material Properties Comparison

| Zirconia Type | Treated Material | A | B | C | D | E | F | G |
|---|---|---|---|---|---|---|---|---|
| Color | Black | Ivory | Ivory | White | Ivory | Ivory | White | Ivory |
| Density (g/cc$^3$) | 6.0 | 6.00 | 5.9 | 6.00 | 6.04 | 5.74 | 6.06 | 6.05 |
| Coefficient of Expansion ($\times 10^{-6}/°$ C.) | 10.0 | 10.00 | 10.00 | 10.30 | 10.00 | 10.2 | | 10.00 |
| Flexuaral Strength (MOE) (Mpa) | 1254 | 981 | 800 | 900 | 1000 | 820 | 900 to 1050 | 1000 |
| Poissons Ratio | 0.31 | 0.31 | | 0.23 | | 0.31 | | 0.31 |
| Youngs Modulus (MOE) (Gpa) | 210 | 206 | | 200 | 215 | 205 | | 205 |
| Hardness (vickers) | 1292 | 1242 | | 1282 | 1300 | 1120 | 1300 | 1300 |
| Fracture Toughness (Kic/m$^5$) | 9.5 | 6.7 | | 8.00 | 5.00 | 8 to 12 | | 10 |

I claim:

1. A treated oxide ceramic material formed by contacting one or more surface(s) of an untreated, sintered zirconia ceramic material with a treatment agent comprising a metallic species selected from the group consisting of: copper, silver, nickel, chromium, aluminum, titanium, zirconium and barium, at a treatment temperature of at least 1100° C. and at a treatment vacuum level of $10^{-3}$ torr or lower for a treatment time of at least five minutes, whereby the treated zirconia ceramic material is a sintered zirconia ceramic material having the metallic species dispersed throughout its ceramic structure.

2. A treated oxide ceramic material of claim 1, wherein the metallic species is titanium.

3. A treated oxide ceramic material of claim 1, wherein the untreated oxide ceramic material comprises yttria-stabilized zirconia.

4. A treated oxide ceramic material of claim 1, wherein the treated oxide ceramic material has a reduced concentration of oxygen species compared to the concentration of oxygen species in the untreated oxide ceramic material.

5. A treated oxide ceramic material of claim 1, wherein the treated oxide ceramic material exhibits a distribution of oxygen species different from the distribution of oxygen species in the untreated oxide ceramic material.

6. A treated oxide ceramic material of claim 1, wherein the surface(s) of the oxide ceramic material contacted by the treatment agent have a lower concentration of oxygen species than areas of the oxide ceramic material that are more distant from surface(s) contacted by the treatment agent.

7. A treated zirconia ceramic material formed by heating an untreated zirconia material under reaction conditions and in the presence of a treatment agent comprising a metallic species selected from the group consisting of: copper, silver, nickel, chromium, aluminum, titanium, zirconium and barium, the reaction conditions providing a combination of heat and vacuum sufficient to cause at least a portion of the metallic species to enter a vapor phase, and the treated zirconia material having the metallic species dispersed within the ceramic structure, and having a reduced concentration of oxygen species compared to the concentration of oxygen species in the untreated zirconia material.

8. A treated zirconia material of claim 7, wherein the treated zirconia material has a darkened coloration compared to the coloration of the untreated zirconia material.

9. A treated zirconia material of claim 8, wherein the treated zirconia material is black.

10. A method for treating zirconia oxide ceramic material comprising:

contacting an untreated zirconia oxide ceramic material with a treatment agent comprising a metallic species selected from the group consisting of: copper, silver, nickel, chromium, aluminum, titanium, zirconium and barium to form a treatment assembly;

heating the treatment assembly at an elevated treatment temperature and under vacuum conditions in the presence of a material that sorbs oxygen species from oxide ceramic materials for a treatment time and under treatment conditions that promote diffusion of the metallic species throughout the ceramic structure and depletion of oxygen species from the ceramic structure.

11. A method according to claim 10, wherein the untreated oxide ceramic material is unsintered and the elevated treatment temperature is from 1400° C. to 1600° C.

12. A treated zirconia oxide ceramic material formed by heating an untreated zirconia oxide ceramic material under vacuum conditions and in the presence of a treatment agent comprising a titanium metallic species, the treated zirconia oxide ceramic material having the titanium metallic species dispersed throughout the ceramic structure and having a higher defect density than the defect density of the untreated oxide ceramic material.

13. A treated zirconia oxide ceramic material formed by heating an untreated zirconia oxide ceramic material under vacuum conditions and in the presence of a treatment agent comprising a titanium metallic species, the treated zirconia oxide ceramic material having the titanium metallic species dispersed throughout the ceramic structure and having an electrical resistance in the range of $10^9$ ohm/cm$^2$.

14. A treated zirconia oxide ceramic material formed by heating an untreated, sintered zirconia oxide ceramic material under vacuum conditions and in the presence of a treated agent comprising a titanium metallic species, the treated zirconia oxide ceramic material having the metallic species dispersed throughout the ceramic structure and having a flexural strength greater than 1050 Mpa.

15. A darkened zirconia oxide ceramic material formed by heating an untreated zirconia oxide ceramic material under vacuum conditions and in the presence of a treatment agent consisting essential of a titanium metallic species, the darkened zirconia oxide ceramic material having titanium dispersed throughout the ceramic structure and having a flexural strength greater than the flexural strength of the untreated zirconia oxide ceramic material.

* * * * *